UNITED STATES PATENT OFFICE.

PAUL C. BOVING, OF PHILADELPHIA, PENNSYLVANIA.

COMPOSITION FOR TILE.

1,210,756.   Specification of Letters Patent.   Patented Jan. 2, 1917.

No Drawing.   Application filed July 19, 1915.   Serial No. 40,638.

*To all whom it may concern:*

Be it known that I, PAUL C. BOVING, a subject of the King of Denmark, residing at Philadelphia, in the county of Philadelphia and State of Pennsylvania, have invented certain new and useful Improvements in Compositions for Tile, of which the following is a specification.

My invention relates to improvements in composition for tile, the object of the invention being to provide an improved composition of tile for use in walls and floors, and which utilizes as a base, burnt clay, either in the form of broken tile, pottery, bricks, china, porcelain, or other material which has been burned in a kiln, and mix the same with ingredients which permit the formation of the tile without burning the same.

A further object is to provide a tile which can be given various colors, and combinations of colors, by using certain kinds of burnt clay, either using them singly or in combination with other burnt clay to give the desired appearance to the tile.

With these and other objects in view, the invention consists in certain novel ingredients in the composition, and the manner of mixing the same as will be more fully hereinafter described and pointed out in the claims.

As a base, I utilize burnt clay powder, which may be obtained by grinding or pulverizing ordinary burnt tile which has been discarded for one reason or another, or I may use pottery, bricks, china, porcelain, or any other burnt clay material which is otherwise waste products, and grind the same or pulverize the same to obtain a fine powder, and this material I shall hereinafter refer to as "clay powder" which constitutes the base of my improved tile composition.

In making the tile composition I mix with the clay powder, calcined magnesite and chlorid of magnesia, and find a preferable composition to be substantially as follows:—
To sixty (60) pounds of clay powder, I add forty (40) pounds of calcined magnesite, and add chlorid of magnesia in solution to bring the material to a pasty condition, the proportion of chlorid of magnesia being just sufficient to obtain the necessary pasty composition. This composition is passed through a blower, and is partially dried and from the blower the product is removed in the form of a damp powder which is placed in molds and given the necessary pressure to form the tile.

In order to obtain many desirable colors, and combinations of colors, I use burnt clay of various colors. I may use a clay which will burn red, and after burning use the same as a base when powdered, either with or without previously ground material, and I find that I can obtain excellent results by using red, black, and buff colors which are the ordinary colors the clay will burn. Such a tile is therefore formed without the ordinary operation of burning, but the resultant product is composed largely of clay which is previously burned, so that a tile of great strength and long life is the result, and one which is capable of a wide range of ornamentation to imitate various stones and other material.

Having thus described my invention, what I claim as new and desire to secure by Letters Patent is:

1. The herein described method of making a composition tile consisting of mixing ground burnt clay powder with calcined magnesite and chlorid of magnesium in solution in such proportions as to make a pasty mixture, then partially drying this mixture to form a damp powder, and finally compressing the damp powder to form the tile, substantially as described.

2. The herein described method of making a composition tile consisting of mixing ground burnt clay powder with calcined magnesite and chlorid of magnesium in solution in such proportions as to make a pasty mixture, then partially drying this product to form a damp powder, and finally compressing the damp powder in molds to form the tile, substantially as described.

3. The herein described method of making a composition tile consisting of forming a pasty mixture of elements, then partially drying said mixture and forming it into a damp powder and finally compressing the damp powder to form a tile, substantially as described.

In testimony whereof I have signed my name to this specification in the presence of two subscribing witnesses.

PAUL C. BOVING.

Witnesses:
C. E. POTTS,
MARIE JACKSON.